(No Model.) 2 Sheets—Sheet 1.

G. M. CLARK.
CULTIVATOR.

No. 465,126. Patented Dec. 15, 1891.

Attest:
Philip F. Larner.
Nowell Battle

Inventor:
George Marshall Clark,
By Mm C Mead Attorney.

(No Model.) 2 Sheets—Sheet 2.

G. M. CLARK.
CULTIVATOR.

No. 465,126. Patented Dec. 15, 1891.

Attest:
Philip F. Larner,
Howell Bartle

Inventor:
George Marshall Clark
By Wm. C. Wood
Attorney.

UNITED STATES PATENT OFFICE.

GEORGE MARSHALL CLARK, OF HIGGANUM, CONNECTICUT, ASSIGNOR TO CLEMENT S. HUBBARD, OF SAME PLACE.

CULTIVATOR.

SPECIFICATION forming part of Letters Patent No. 465,126, dated December 15, 1891.

Application filed October 29, 1888. Serial No. 289,374. (No model.)

*To all whom it may concern:*

Be it known that I, GEORGE MARSHALL CLARK, of Higganum, in the county of Middlesex and State of Connecticut, have invented certain new and useful Improvements in Cultivators; and I do hereby declare that the following specification, taken in connection with the drawings furnished and forming a part thereof, is a clear, true, and complete description of my invention.

One object of my invention is to provide in a cultivator a capacity for the sub-surface cutting of weeds and roots throughout the entire width of the path of the cultivator. This I accomplish by the combination, with a suitable frame, of a series of cutters devised by me, each having a pointed top, and at the bottom a wide or broad cutting-edge standing crosswise with relation to the frame, and each being concavo-convex from said edge upward to its top and to the leg or standard on which the cutter is secured, and these cutters and their legs are mounted in said frame so that the path of each cutting-edge will overlap upon the paths of one or two other cutting-edges. The said overlapping feature causes the entire width of the path of the machine to be effectively covered as to the cutting of weeds and roots, and the vertical concavo-convexity of the cutters causes each to continuously work its way angularly and downward whenever the operator is not pulling back, so as to lift the cultivator, as is common in its use. In their best form said cutters have vertically-arched or concavo-convex edges, somewhat after the manner of a gouge, and this feature is conducive to highly effective service, because it causes the edges to operate with somewhat of a "draw-cut" in severing weeds or roots which occupy normally a substantially vertical position.

To more particularly describe my invention, I will refer to the accompanying drawings, in which—

Figure 1:
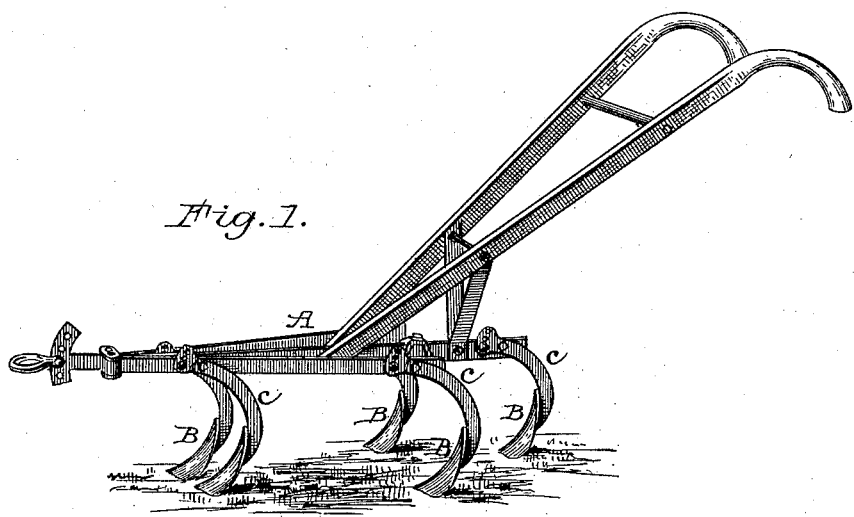
Figure 2:
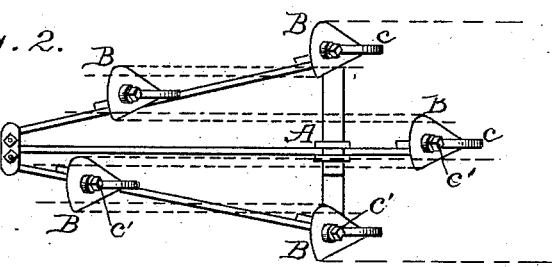
Figure 3:
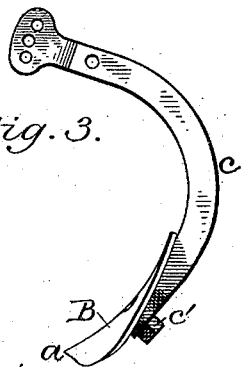
Figure 4:
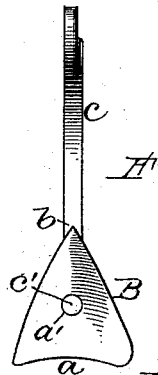
Figure 5:
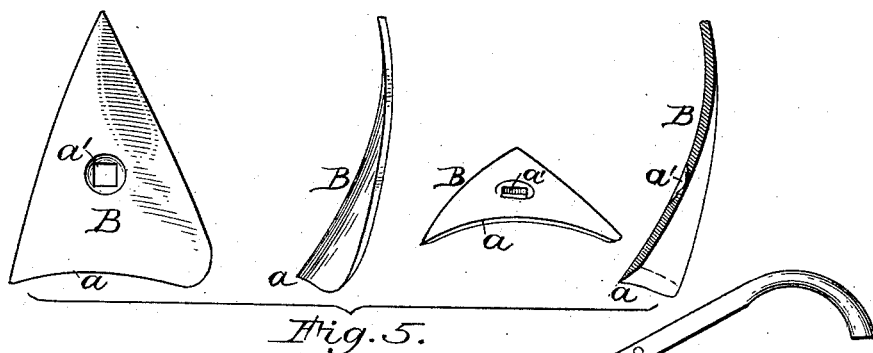
Figure 6:
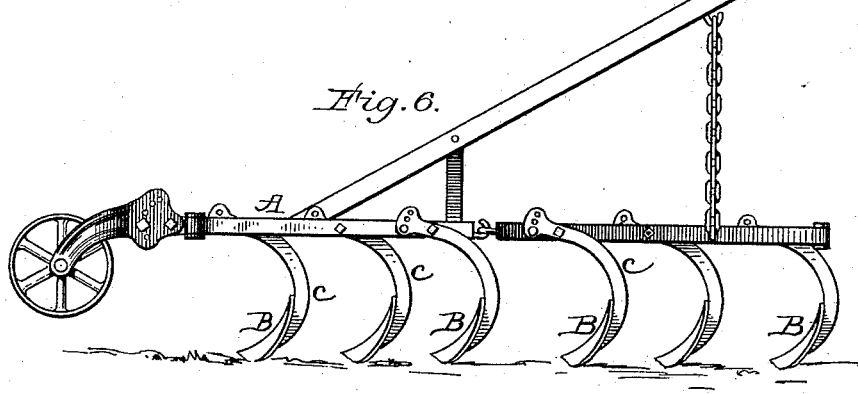
Figure 7:
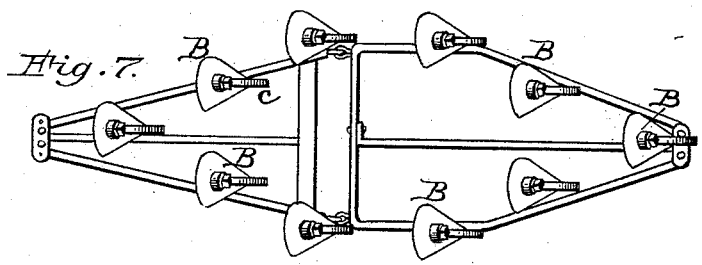
Figures 8, 9:
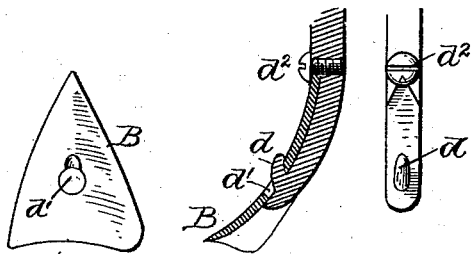

Figure 1 illustrates one of my improved cultivators in side view. Fig. 2 illustrates the frame of said cultivator and its cutters bottom side up. Figs. 3 and 4, in side and front views, illustrate one of the cutters and its leg detached from the machine. Fig. 5 in several views illustrates one of the cutters detached. Figs. 6 and 7, in side elevation and bottom view, illustrate a more complex form of cultivator having a double set of cutters. Figs. 8 and 9 illustrate a cutter and a leg, which are also readily united and separated; but the securing devices are a hook-stud and a bolt which need not be wholly withdrawn from its threaded seat, and which may be merely rotative in its seat.

Referring to Figs. 1 and 2, it will be understood that the frame A is provided with handles in a usual manner, and that said frame is of triangular form, its width and length being of course varied according to the number and arrangement of the cutters B to be employed. The cutters B are composed of steel, and have an outline which is triangular in isosceles proportions, the cutting-edge $a$ being at its base. This broad or wide cutting-edge is mainly straight laterally, but is nevertheless concavo-convex, or, in other words, arched vertically when the cutter is in position for service, and the corners may be angular or rounded without departure from my invention, although I prefer one angular and one rounded corner, as shown. The cutter is also concavo-convex from its edge $a$ to its top or point $b$, as clearly indicated, for causing it to bury its edge in the soil while the cultivator is being moved forward, and also enabling it to readily free itself from adhering soil. The legs, standard, or pendants $c$ at their upper ends are as heretofore, and provided with the usual bolts and nuts for securing them to the frame. Their lower ends are so curved and shaped in front as to afford firm seats or backing for the cutters, and these and the said legs are so constructed that they may be readily united and separated. As shown in Figs. 1 to 5, the cutters are provided with a bolt-hole at $a'$ well countersunk, but preferably squared at the back side of the hole for the reception of a bolt having a square shank beneath a flat round thin flaring head, said bolts $c'$ occupying holes in the legs $c$ and having nuts on their inner threaded ends for clamping the cutters upon and in front of the standards. It is sometimes desirable to have a shallow $\Lambda$-shaped recess in the leg for occupation by the upper end or point $b$ of the cutter, and to thereby contribute to the more secure confining of the cutter in place. For avoiding the loosening and consequent liability of loss or misplacement of such nuts or bolts, I sometimes employ bolts, which need never be wholly displaced from their seats—as, for instance, as illustrated in Figs. 8 and 9—wherein a hook-stud $d$ fixedly projects from the leg, and the cutter has an irregularly-shaped hole $d'$, which will freely receive said stud, so that when the cutter is allowed to rest thereon it will be confined by the stud against both lateral and downward movements, and then when the pointed top of the cutter is located in the shallow ∧-shaped recess in the leg and confined therein by the head of a bolt $d^2$ the cutter is rigidly mounted in place; but its removal for the substitution of a sharp cutter can be easily effected in a fraction of a minute, and instead of having this bolt threaded it may be a mere rivet in form rotatively mounted in its seat, and its head cut away on one side and beveled beneath the head, so as to operate as the well-known turn-button clamp.

Now, referring to Fig. 2, it will be seen that the several cutters are arranged so that while each has its own path each also slightly overlaps the path of one or of two other cutters—as, for instance, the two front cutters partially overlap the path of the rear cutter—and they also at their outer corners partially overlap the paths of the two outer cutters, and these latter in turn at their inner corners overlap portions of the paths of the front cutters, as indicated by the several dotted lines, thus rendering it absolutely certain that their aggregate cutting action will extend throughout the width of the machine, and it will be obvious that each cutter will mainly operate on original or unbroken surfaced ground, which, being usually hard or crusty, will enable the cutters to do effective work in separating tops of weeds, &c., from their roots in a manner highly conducive to the destruction of both. It will also be seen that the upper curved surface of the cutters will cause each to dive into the soil as the machine moves forward, and that the occasional pulling back on the handles by the operator and straightening the usual draft-chain or traces will cause the cutters to be freed from weeds, and also in like manner he can prevent the cutters from plowing too deeply into the soil. While it will not constitute any departure from certain portions of my invention to have the broad cutting-edges flat and straight, or flat with receding or projecting corners, the best results will accrue by the use of the arched or vertically concavo-convex edge, because of its tendency to operate with a draw-cut action when forced into contact with stalks and roots. It will be obvious that these cutters should be kept as sharp as may be practicable, and hence I provide each machine with two or more sets of cutters, so that a sharp set can be promptly applied, and as one frame will outlast many sets of cutters these latter will in themselves constitute a valuable article of manufacture and trade.

For some lines of service it will be advisable to employ in one machine a larger number of cutters than are shown in the machine, Figs. 1 and 2, and I illustrate in Figs. 6 and 7 a machine in which two sets of cutters are employed. The front or main set are arranged substantially as in Figs. 1 and 2, except that the central cutter is placed in front instead of at the rear. The rear or auxiliary cutters are mounted in a V-frame, loosely and detachably coupled to the rear of the side pieces of the main frame to allow of a hinging movement, and connected with the handle-bars by means of rods, or, preferably, by chains and hooks, which will permit free upward movement of said frame, (and cutters,) while limiting its downward movement, and enabling it to be lifted bodily and in the same horizontal plane with the front frame portion whenever the operator shall pull backward during the forward movement of the draft-animal. With this machine the rear set of cutters will do effective soil-working duty, and also more or less destructive work on the grass, weeds, and roots cut by the main set of cutters, and when weeds are heavy the rear set of cutters and their legs will serve to collect and drag masses of the cut-up weeds and roots, which may be removed or dropped from time to time. In some large machines I employ twenty-five or more of these cutters, and in some instances the swath cut thereby is nearly five feet in width, over the whole of which all weeds will be thoroughly cut and uprooted.

Having thus described my invention, I claim as new and desire to secure by Letters Patent—

1. In a cultivator, the combination, with a frame and standards pendent therefrom, of a series of broad-edged cutters mounted on and in front of said standards, each cutter being pointed at its upper end and concavo-convex from the cutting-edge upward to said point, and having the path of each cutting-edge slightly overlapping the paths of one or two of the other cutting-edges of the set of cutters, substantially as described, whereby during the forward movement of the cultivator said cutters will operate not only sub-surface in the cutting of roots and weeds throughout the width of the machine, but also operate on the soil at and above the surface of the ground.

2. In a cultivator, the combination, with a frame, of a series of standards pendent therefrom and cutters detachably mounted on and in front of said standards, and each cutter having a broad gage-like cutting-edge, and which is also concavo-convex from said edge upward to the top of the cutter, substantially as described.

GEORGE MARSHALL CLARK.

Witnesses:
ROBERT S. CRUTTENDEN,
EDWARD G. HUNTINGTON.